United States Patent
Egan (10) Patent No.: US 9,526,663 B2
(45) Date of Patent: Dec. 27, 2016

(54) POWER LIFT AND TRANSFER SYSTEM AND METHOD

(71) Applicant: Thomas F. Egan, Binghamton, NY (US)

(72) Inventor: Thomas F. Egan, Binghamton, NY (US)

(*) Notice: Subject to any disclaimer, the term of this patent is extended or adjusted under 35 U.S.C. 154(b) by 92 days.

(21) Appl. No.: 13/998,002

(22) Filed: Sep. 23, 2013

(65) Prior Publication Data

US 2015/0086311 A1    Mar. 26, 2015
US 2016/0184149 A9    Jun. 30, 2016

Related U.S. Application Data

(63) Continuation of application No. 12/461,029, filed on Jul. 29, 2009, now Pat. No. 8,540,474.

(60) Provisional application No. 61/129,922, filed on Jul. 29, 2008.

(51) Int. Cl.

| | |
|---|---|
| *B60P 9/00* | (2006.01) |
| *A61G 3/06* | (2006.01) |
| *A61G 7/10* | (2006.01) |
| *B60R 5/04* | (2006.01) |
| *B60R 9/06* | (2006.01) |
| *A61G 3/08* | (2006.01) |

(52) U.S. Cl.
CPC ............. *A61G 3/062* (2013.01); *A61G 3/0808* (2013.01); *A61G 7/1001* (2013.01); *A61G 7/1034* (2013.01); *A61G 7/1059* (2013.01); *B60R 5/04* (2013.01); *B60R 9/06* (2013.01); *A61G 7/1015* (2013.01); *A61G 7/1046* (2013.01)

(58) Field of Classification Search
CPC A61G 3/0808; A61G 2220/145; A61G 3/062; A61G 3/0209; A61G 3/063; Y10S 414/134; Y10S 297/04; Y10S 180/907; Y10S 180/908; B60D 1/26; B60D 1/00; B60D 1/02
USPC ....... 224/282; 280/42; 293/106, 117, 411.32, 293/411.37; 414/462, 528, 539, 540, 541, 545, 414/549, 550, 556, 921, 723–724; 296/63, 296/65.01, 65.04; 212/180, 230, 231, 258, 264, 212/348, 350; 37/468; 403/192, 204, 292, 315, 403/323
See application file for complete search history.

(56) References Cited

U.S. PATENT DOCUMENTS

| | | | |
|---|---|---|---|
| 360,578 A | | 4/1887 | Francis |
| 1,465,168 A | * | 8/1923 | Monroe .................. 280/510 |
| 2,636,744 A | * | 4/1953 | Trees ..................... 280/510 |
| 2,792,951 A | | 5/1957 | White |
| 2,864,431 A | | 12/1958 | Eaton |

(Continued)

FOREIGN PATENT DOCUMENTS

| | | |
|---|---|---|
| DE | 3123546 | 1/1983 |
| GB | 2322352 | 8/1998 |

(Continued)

OTHER PUBLICATIONS

Bruno Independent Living Aids, Inc., Operator/Installation Manual; 2001.

*Primary Examiner* — Gregory Adams (57) ABSTRACT

A power lift and transfer system and method are disclosed. In one particular exemplary embodiment, the power lift and transfer system and method may be realized as a power lift and transfer system. The power lift and transfer system may move, stow, and carry a mobility device for a user with a disability, and then assist the person with the disability to transfer in and out of a vehicle. The power lift and transfer system may further transport the wheeled or other mobility (Continued)

device from a position in a rear or on top of the vehicle to passenger or driver areas of the vehicle, and then assist the user by means of a conveyor belt to transfer laterally into the automobile seat.

20 Claims, 11 Drawing Sheets (56) References Cited

U.S. PATENT DOCUMENTS

| | | | |
|---|---|---|---|
| 3,147,994 A | 9/1964 | Lapine | |
| 3,516,559 A | 6/1970 | Walter | |
| 3,710,962 A | 1/1973 | Fowler, Jr. | |
| 3,715,039 A | 2/1973 | Kollmann et al. | |
| 3,891,237 A * | 6/1975 | Allen | 280/477 |
| 3,896,946 A | 7/1975 | Forsyth et al. | |
| 4,015,725 A | 4/1977 | Ryan et al. | |
| 4,075,719 A | 2/1978 | Sullivan | |
| 4,096,955 A | 6/1978 | Dake | |
| 4,133,437 A | 1/1979 | Gates | |
| 4,140,230 A | 2/1979 | Pearson | |
| 4,142,641 A | 3/1979 | Dake | |
| 4,169,338 A | 10/1979 | Eik | |
| 4,170,368 A | 10/1979 | Southward | |
| 4,183,708 A * | 1/1980 | Kuhbier et al. | 414/543 |
| 4,225,149 A * | 9/1980 | Koopman | 280/477 |
| 4,226,567 A | 10/1980 | Van Orsdale, Jr. | |
| 4,270,630 A | 6/1981 | Karkau | |
| 4,298,128 A | 11/1981 | Gattu | |
| 4,306,634 A | 12/1981 | Sangster | |
| 4,365,924 A | 12/1982 | Brigman et al. | |
| 4,398,858 A | 8/1983 | Paffrath | |
| 4,406,574 A | 9/1983 | Riley | |
| 4,420,286 A | 12/1983 | Hanson et al. | |
| 4,438,640 A | 3/1984 | Willis | |
| 4,457,663 A * | 7/1984 | Hems et al. | 414/522 |
| 4,458,870 A | 7/1984 | Duncan et al. | |
| 4,463,965 A * | 8/1984 | Lawson | 280/414.1 |
| 4,479,753 A | 10/1984 | Thorley | |
| 4,483,653 A | 11/1984 | Waite | |
| 4,545,085 A | 10/1985 | Feldt | |
| 4,551,060 A | 11/1985 | Quercy | |
| 4,566,842 A * | 1/1986 | Clarke | 414/462 |
| 4,569,094 A | 2/1986 | Hart et al. | |
| 4,573,854 A | 3/1986 | McFarland | |
| 4,605,132 A | 8/1986 | Van Seumeren | |
| 4,616,972 A | 10/1986 | McFarland | |
| 4,644,595 A | 2/1987 | Daniel | |
| 4,659,276 A | 4/1987 | Billett | |
| 4,661,035 A | 4/1987 | Danielsson | |
| 4,664,584 A | 5/1987 | Braun et al. | |
| 4,671,729 A | 6/1987 | McFarland | |
| 4,685,860 A | 8/1987 | McFarland | |
| 4,786,072 A | 11/1988 | Girvin | |
| 4,793,626 A * | 12/1988 | Gefroh | 280/478.1 |
| 4,797,042 A | 1/1989 | McFarland | |
| 4,801,237 A | 1/1989 | Yamamoto | |
| 4,808,056 A | 2/1989 | Oshima | |
| 4,809,998 A | 3/1989 | Girvin | |
| 4,844,497 A * | 7/1989 | Allen | 280/477 |
| 4,893,963 A * | 1/1990 | Le Goff | 403/322.3 |
| 4,955,779 A | 9/1990 | Knackstedt | |
| 4,974,766 A | 12/1990 | DiPalma et al. | |
| 5,022,106 A | 6/1991 | Richards | |
| 5,035,467 A | 7/1991 | Axelson et al. | |
| 5,040,832 A | 8/1991 | Zalewski | |
| 5,102,195 A | 4/1992 | Axelson et al. | |
| 5,149,246 A | 9/1992 | Dorn | |
| 5,154,563 A | 10/1992 | Phillips | |
| 5,160,236 A | 11/1992 | Redding et al. | |
| 5,180,275 A | 1/1993 | Czech et al. | |
| 5,193,633 A | 3/1993 | Ezenwa | |
| 5,201,377 A | 4/1993 | Wilson | |
| 5,205,697 A | 4/1993 | Getty et al. | |
| 5,261,779 A | 11/1993 | Goodrich | |
| 5,308,214 A | 5/1994 | Crain et al. | |
| 5,333,333 A | 8/1994 | Mah | |
| 5,344,265 A * | 9/1994 | Ullman et al. | 410/3 |
| 5,348,172 A | 9/1994 | Wilson | |
| 5,375,913 A | 12/1994 | Blanchard | |
| 5,431,526 A | 7/1995 | Peterson et al. | |
| 5,456,335 A | 10/1995 | Kinsey | |
| 5,456,568 A | 10/1995 | Kirby et al. | |
| 5,459,891 A | 10/1995 | Reeve et al. | |
| 5,467,813 A | 11/1995 | Vermaat | |
| 5,502,851 A | 4/1996 | Costello | |
| 5,520,403 A | 5/1996 | Bergstrom et al. | |
| 5,540,539 A | 7/1996 | Wolfman et al. | |
| 5,542,811 A | 8/1996 | Vartanian | |
| 5,560,054 A | 10/1996 | Simon | |
| 5,617,963 A | 4/1997 | Baziuk et al. | |
| 5,628,595 A * | 5/1997 | Harris | 410/7 |
| 5,630,638 A | 5/1997 | Hirasawa et al. | |
| 5,639,105 A | 6/1997 | Summo | |
| 5,649,329 A | 7/1997 | Horcher et al. | |
| 5,682,630 A | 11/1997 | Simon | |
| 5,746,563 A | 5/1998 | Steckler | |
| 5,827,036 A | 10/1998 | Steffes et al. | |
| 5,845,348 A | 12/1998 | Dunn et al. | |
| 5,857,832 A | 1/1999 | Al-Temen et al. | |
| 5,987,664 A | 11/1999 | Somerton et al. | |
| 6,026,523 A | 2/2000 | Simon et al. | |
| 6,039,402 A | 3/2000 | Nemoto | |
| 6,042,330 A | 3/2000 | Egan | |
| 6,086,085 A * | 7/2000 | Larsson | 280/648 |
| 6,086,312 A | 7/2000 | Ziaylek et al. | |
| 6,223,364 B1 | 5/2001 | Egan | |
| 6,260,218 B1 | 7/2001 | Tsuga | |
| 6,283,528 B1 | 9/2001 | Townsend | |
| 6,289,534 B1 | 9/2001 | Hakamiun et al. | |
| 6,296,221 B1 | 10/2001 | Nadeau | |
| 6,367,103 B1 | 4/2002 | Collins | |
| 6,386,614 B1 * | 5/2002 | Logan | 296/65.03 |
| 6,390,554 B1 | 5/2002 | Eakins et al. | |
| 6,416,272 B1 * | 7/2002 | Suehiro et al. | 414/546 |
| 6,526,677 B1 * | 3/2003 | Bloxdorf et al. | 37/231 |
| 6,595,738 B2 | 7/2003 | Rock et al. | |
| 6,612,615 B1 | 9/2003 | Dimand | |
| 6,612,802 B2 | 9/2003 | Egan | |
| 6,682,291 B2 | 1/2004 | Schatzler et al. | |
| 6,692,215 B1 | 2/2004 | Panzarella et al. | |
| 6,739,642 B1 | 5/2004 | Egan | |
| 6,739,824 B2 | 5/2004 | Dupuy et al. | |
| 6,820,911 B2 | 11/2004 | Furui | |
| 6,823,541 B2 | 11/2004 | Egan | |
| 6,928,766 B1 * | 8/2005 | Goebel et al. | 43/27.4 |
| 7,011,330 B2 * | 3/2006 | Blanton | 280/510 |
| 7,100,718 B2 * | 9/2006 | Bancroft | 180/65.1 |
| 7,108,466 B2 * | 9/2006 | Panzarella et al. | 410/7 |
| 7,182,385 B2 | 2/2007 | Christopher | |
| 7,207,765 B1 | 4/2007 | Egan | |
| 7,284,944 B1 | 10/2007 | Schlangen | |
| 7,316,441 B2 | 1/2008 | Iwatani et al. | |
| 7,340,801 B2 * | 3/2008 | Yamaguchi | 16/368 |
| 7,347,658 B2 * | 3/2008 | Schlangen | 414/541 |
| 7,374,390 B2 * | 5/2008 | Strong | 414/546 |
| 7,383,107 B2 | 6/2008 | Fehr | |
| 7,402,019 B2 | 7/2008 | Alexander | |
| 7,404,505 B2 | 7/2008 | Walther | |
| 7,543,876 B1 | 6/2009 | Egan | |
| 7,621,365 B2 | 11/2009 | Egan | |
| 7,651,313 B1 | 1/2010 | Egan | |
| 7,717,663 B1 | 5/2010 | Stowers | |
| 7,862,287 B2 | 1/2011 | Egan | |
| 8,132,997 B2 | 3/2012 | Reuille et al. | |
| 2003/0108412 A1 * | 6/2003 | Zimmer | 414/522 |
| 2005/0264020 A1 | 12/2005 | Egan | |
| 2006/0045686 A1 | 3/2006 | Alexander | |
| 2006/0087166 A1 | 4/2006 | Trippensee et al. | |
| 2006/0182569 A1 | 8/2006 | Andersson | |
| 2010/0040452 A1 | 2/2010 | Egan | |
| 2012/0091772 A1 | 4/2012 | Egan | |

(56) References Cited

U.S. PATENT DOCUMENTS

FOREIGN PATENT DOCUMENTS

| | | |
|---|---|---|
| JP | 11-253492 | 9/1999 |
| JP | 2001315565 | 11/2001 |
| JP | 2004195062 | 7/2004 |
| SU | 1484678 A | 6/1989 |

* cited by examiner

POWER LIFT AND TRANSFER SYSTEM AND METHOD

CROSS-REFERENCE TO RELATED APPLICATIONS

This patent application is a continuation of U.S. patent application Ser. No. 12/461,029, filed Jul. 29, 2009, which claims priority to U.S. Provisional Patent Application No. 61/129,922, filed Jul. 29, 2008, each of which is hereby incorporated by reference herein in its entirety.

FIELD OF THE DISCLOSURE

The present disclosure relates generally to systems and methods for lifting and transferring wheeled mobility devices for persons with disabilities and persons with disabilities into and out of vehicles and, more particularly, to a power lift and transfer system and method for assisting persons in lifting and transferring a wheeled mobility device when entering and exiting a vehicle, as well as a conveyor and support system for facilitating persons with disabilities into and out of a vehicle.

BACKGROUND OF THE DISCLOSURE

Users with disabilities who wish to travel using a wheelchair or other wheeled mobility device, but who do not have a vehicle which allows for easy stowage of the mobility device, often encounter problems. For example, vehicles such as minivans and full-sized vans with large cargo doors, pickup trucks with large access cabs or cargo boxes, and SUV's benefit from large and logical wheelchair storage areas, several of which are located conveniently close to the seating area which individuals with disabilities may need to access. Preferably, with such vehicles, there is a minimum of distance between where a wheelchair may be stowed and the destination of the individual inside the vehicle. For reasons of fuel economy, personal choice, and/or comfort, many wheelchair or mobility-impaired persons who are unable to, or for whom it is unsafe to, walk to the rear of a vehicle from a passenger or driver's door, will desire access to vehicles with severe space constraints. These persons may nevertheless wish to store either a power or manual wheelchair or other personal mobility aid such as a walker with the vehicle. In vehicles with severe space constraints, this may mean that the only logical place to store a large object is outside the vehicle. Although some lifts exist which allow a user to store a mobility device in the rear of a vehicle, the majority of those lifts do lot allow for delivery of the mobility device to the driver's or passenger's compartment, which is essential to many-mobility-impaired users. Some lifts do exist which allow both for stowage of a wheelchair on a rooftop and delivery of same to a driver's or passenger's door. However, many users have reservations about such technology as rooftop devices often compromise appearance, fuel economy, handling, and stability of the vehicle. Also, several transfer devices exist which allow a user to access a vehicle seat directly from outside of a vehicle through a variety of means, including pivoting vehicle seats which tilt and/or exit the vehicle to facilitate transfers, devices which provide an elevator platform adjacent to a vehicle seat or which create a removable or non-removable bridge from a mobility device to the vehicle seat. Again, however, such devices typically do not address the special circumstances created by vehicles with significant space constraints. In such vehicles, there is often not enough space to facilitate either the ejection of a vehicle seat through a vehicle door opening or for other specialized equipment in the interior of the vehicle. An additional challenge is posed by the fact that the transfer process into the interior of a smaller vehicle is made more difficult by an accordingly small passenger compartment and/or door opening.

In view of the foregoing, it may be understood that there may be significant problems and shortcomings associated with current mobility assistance systems.

SUMMARY OF THE DISCLOSURE

A power lift and transfer system and method are disclosed. In one particular exemplary embodiment, the power lift and transfer system and method may be realized as a power lift and transfer system. The power lift and transfer system may move, stow, and carry a mobility device for a user with a disability, and then assist the person with the disability to transfer in and out of a vehicle. The power lift and transfer system may further transport the wheeled or other mobility device from a position in a rear or on top of the vehicle to passenger or driver areas of the vehicle, and then assist the user by means of a conveyor belt to transfer laterally into the automobile seat. The transfer conveyor belt system operates in a unique manner. That is, once the user has arrived at the door of the vehicle, the user may transfer onto a seat of the vehicle and then activate a motorized conveyor belt system which may be placed across a base of a cushion of the seat to pull the user a remainder of the distance required for proper seated placement within the vehicle and subsequent travel in the vehicle. The transfer conveyor belt system may comprise one or two motors and/or springs to activate either a conveyor belt configured in a loop or a belt attached to two motorized or spring-operated spindles, one on each end, and may be activated in both in and out directions. The transfer conveyor belt system may also comprise an additional bridge component which may comprise an additional conveyor configured similarly to the seat cushion conveyor system, but which has an added advantage of providing a powered conveyor motion in a space between the user's mobility device and the seat of the vehicle. The wheelchair stowage portion of the system may be configured in at least a suspended version and a fixed attachment version. The suspended version may use a flexible strap, belt, net, or chain to support the mobility device, while the fixed attachment version may provide a positive interlocking connection to the mobility device while it is being stowed and transported.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
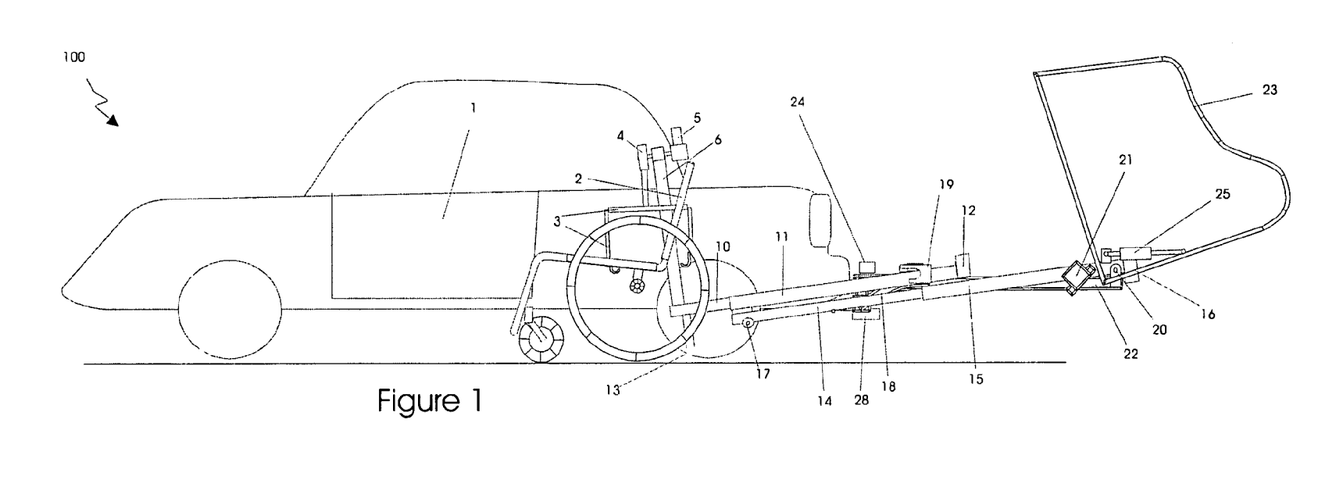
FIG. 1 is a side view of a power lift and transfer system in accordance with an embodiment of the present disclosure in a bumper-mounted version with a wheelchair on the ground, fully deployed and adjacent to a door of a vehicle utilizing a suspended strap docking device as detailed in FIG. 5.
Figure 5:
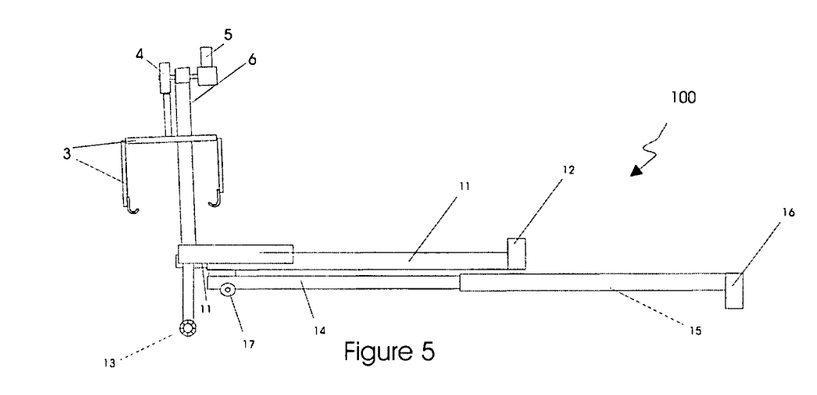
FIG. 5 is a detail view of a suspended strap style docking device referred to in FIG. 1 in accordance with an embodiment of the present disclosure.

Referring to FIG. 1 there is shown a power lift and transfer system 100 in accordance with an embodiment of the present disclosure in a bumper-mounted version with a wheelchair on the ground, fully deployed and adjacent to a door 1 of a vehicle utilizing a suspended strap docking device as detailed in FIG. 5. Beginning from the bottom of the system 100 upward and rearward, the system 100 includes a wheelchair 2 to be attached to a suspended strap docking device 3. Docking device comprises a strap which is spooled into a reel 4 which is attached to a shaft of a motor 5, the housing of which is firmly attached to a vertical support 6.

Figure 2:
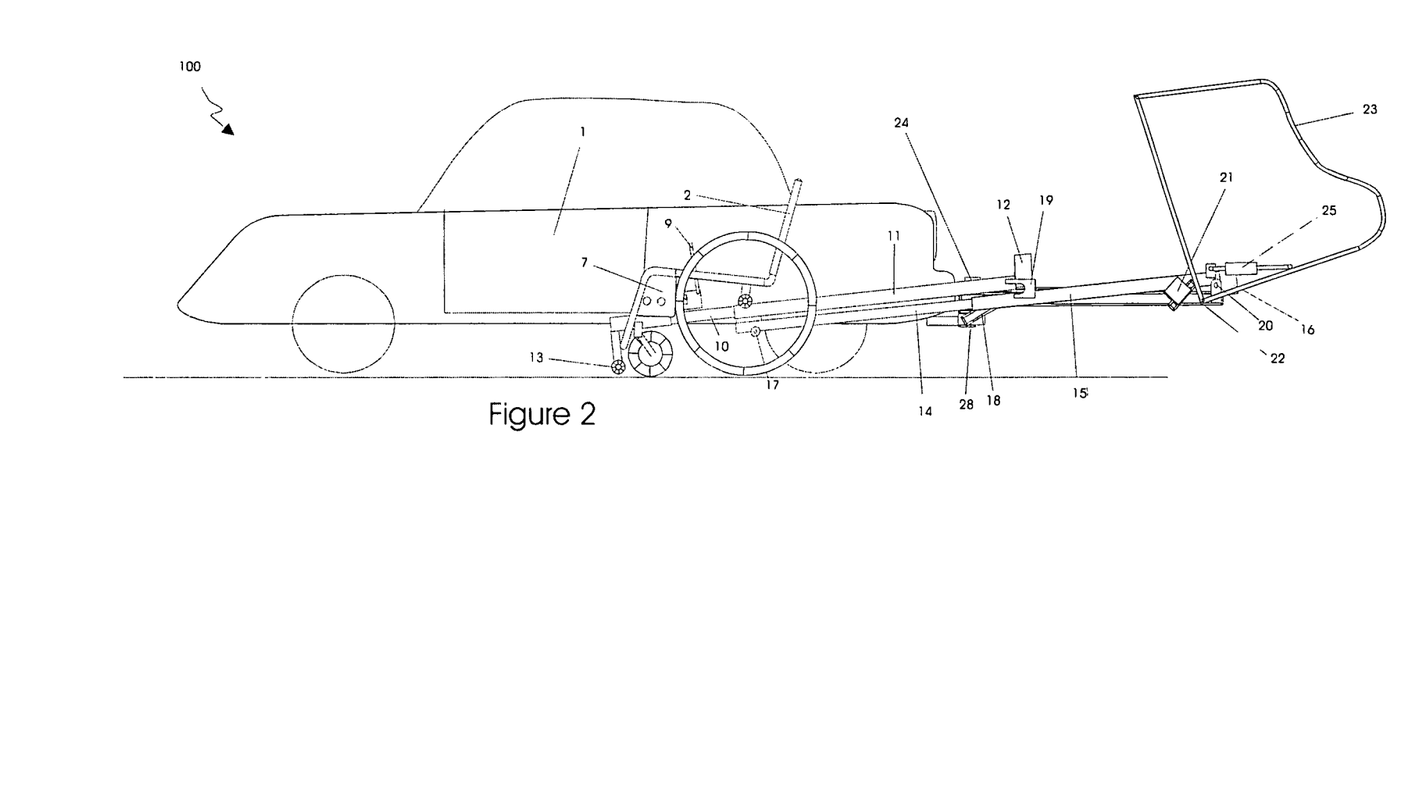
FIG. 2 is a side view of a power lift and transfer system in accordance with an embodiment of the present disclosure in a bumper-mounted version with a wheelchair on the ground, fully deployed and adjacent to a door of a vehicle utilizing a latch and bolt docking device as detailed in FIG. 6.
Figure 3:
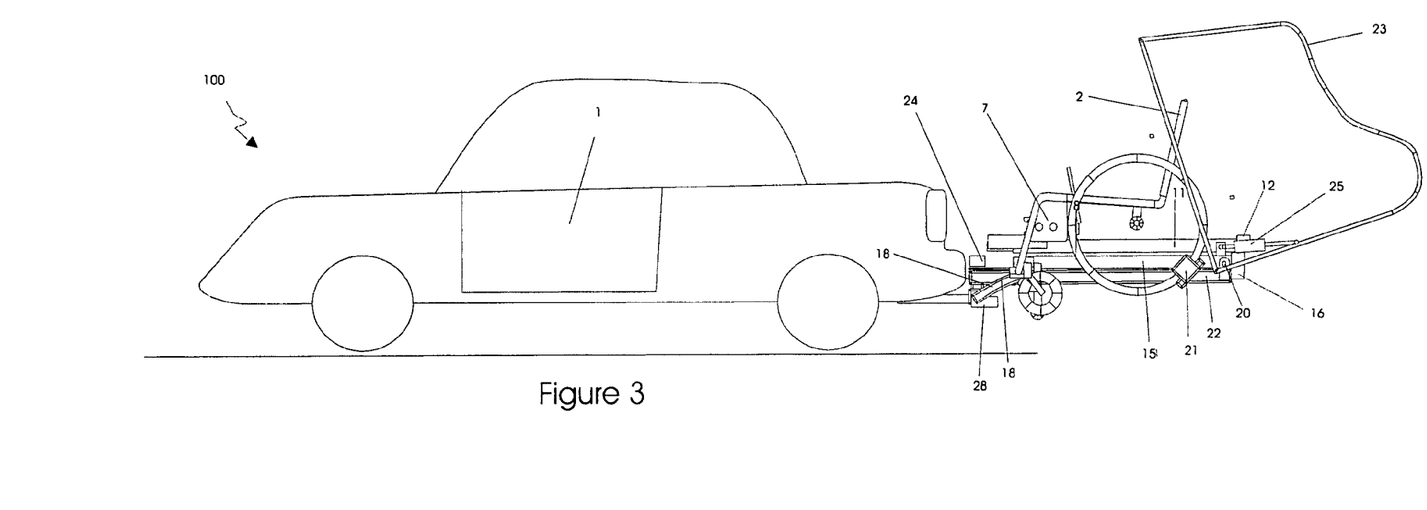
FIG. 3 is a side view of a power lift and transfer system in accordance with an embodiment of the present disclosure in a bumper-mounted version with a wheelchair lifted and in a fully rearward position and with a canopy open.
Figure 4:
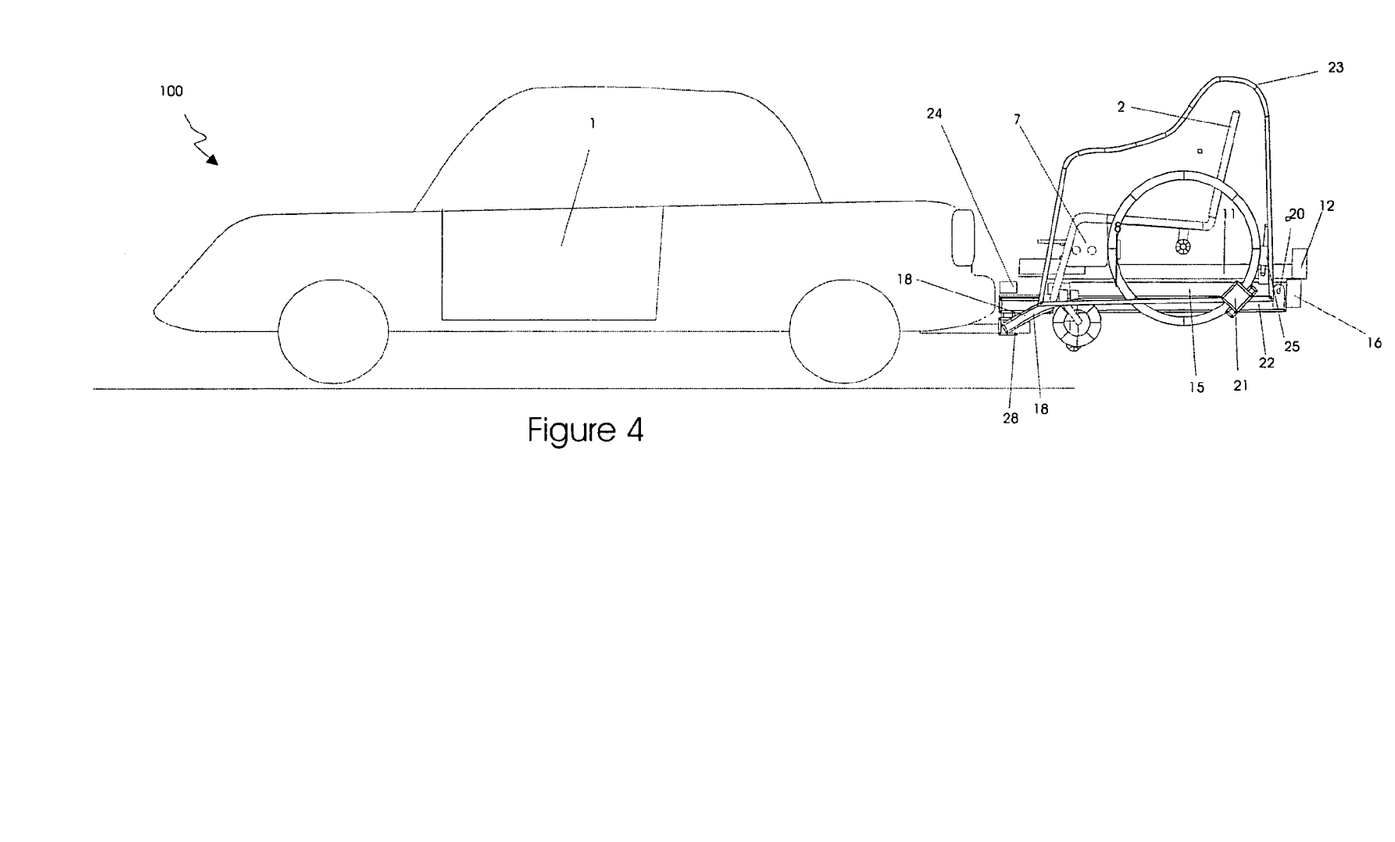
FIG. 4 is a side view of a power lift and transfer system in accordance with an embodiment of the present disclosure in a bumper-mounted version with a wheelchair lifted and in a fully rearward position and with a canopy closed.
Figure 6:
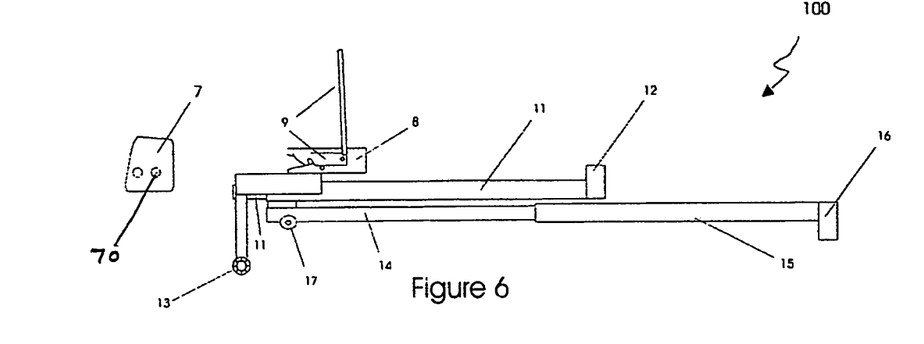
FIG. 6 is a detail view of a latch and bolt style docking device referred to in FIG. 2 in accordance with an embodiment of the present disclosure.

Referring to FIGS. 2-4, the system 100 is a bumper-mounted version with a wheelchair on the ground, fully deployed and adjacent to a door of a vehicle utilizing a latch and bolt docking device as detailed in FIG. 6. However, these figures are also representative of the operation and motion of the system 100 in the suspended strap (FIG. 5) and blade (FIG. 7) configurations.

Figure 8:
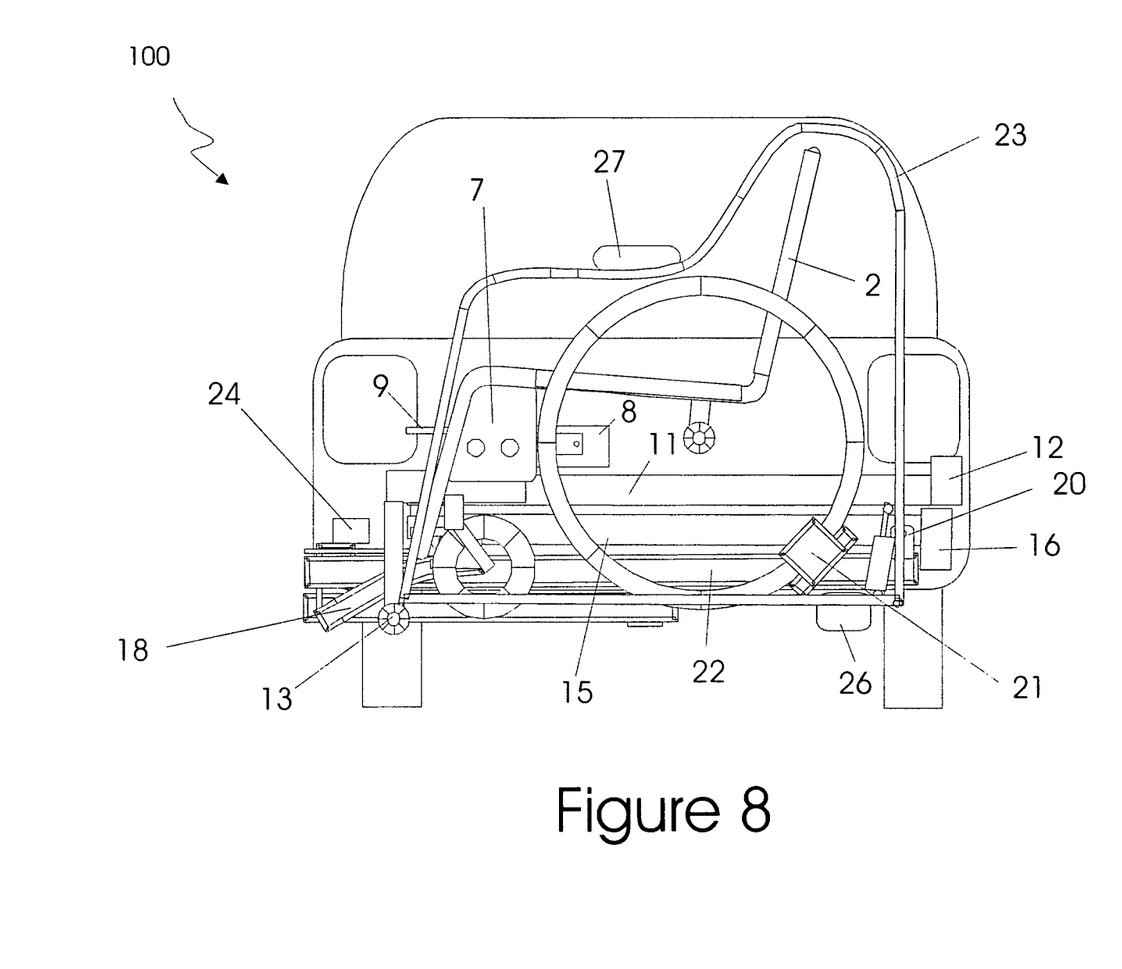
FIG. 8 is a rear view of a power lift and transfer system in accordance with an embodiment of the present disclosure in a bumper-mounted version with a wheelchair in a fully stowed position.

During typical operation of the system 100, the motion of all motors is controlled by an electrical controller 26, which can control motors through encoders located within the motors or by means of limit switches located at various points during a stowage and deployment process. Upon activation of motor 5, suspended strap docking device 3 may be raised or lowered, thus raising or lowering wheelchair 2, which may be attached to suspended strap docking device 3 via hooks or other means of temporary connection in suspended strap docking device 3. Upon completion of this motion, or concurrently with it, extension shaft 10 may be retracted into an extension shaft sleeve 11 driven by motor 12, and an extension shaft 14 may be driven into an extension shaft sleeve 15 by a motor 16. Smooth motion across the ground and proper weight support of system 100 may be provided by a wheel 13 as the wheelchair moves rearward. Upon arrival of a wheel 17 at a ramp 18, a pivoting motion about an axle 20 is induced, causing extension shafts 10 and 14 and extension shaft sleeves 15 and 11 to arrive at a substantially horizontal position. Upon arrival of the wheelchair at a stop 21, an actuator 25 propels a canopy 23 to a closed position and rotation of a horizontal support member 22 commences rotation about an axle 24 towards a rear of the vehicle powered by a motor 28 until it reaches a position approximately parallel with a rear face of the vehicle and perpendicular to a longitudinal axis of the vehicle as pictured in FIG. 8. System 100 is at that point in a fully stowed position.

Referring to FIG. 6, the latch and bolt style docking device is shown in which the wheelchair 2 is fitted with a bolt plate 7, the bolt(s) 70 of which are designed to be moved rearward into a "v" opening of a receiver 8 and latched to the receiver 8 by means of a pivoting motion of a latch 9. In an alternative embodiment, the wheelchair 2 could be fitted with the receiver 8 and the bolt plate 7 could be mounted to the vehicle.

Figure 7:
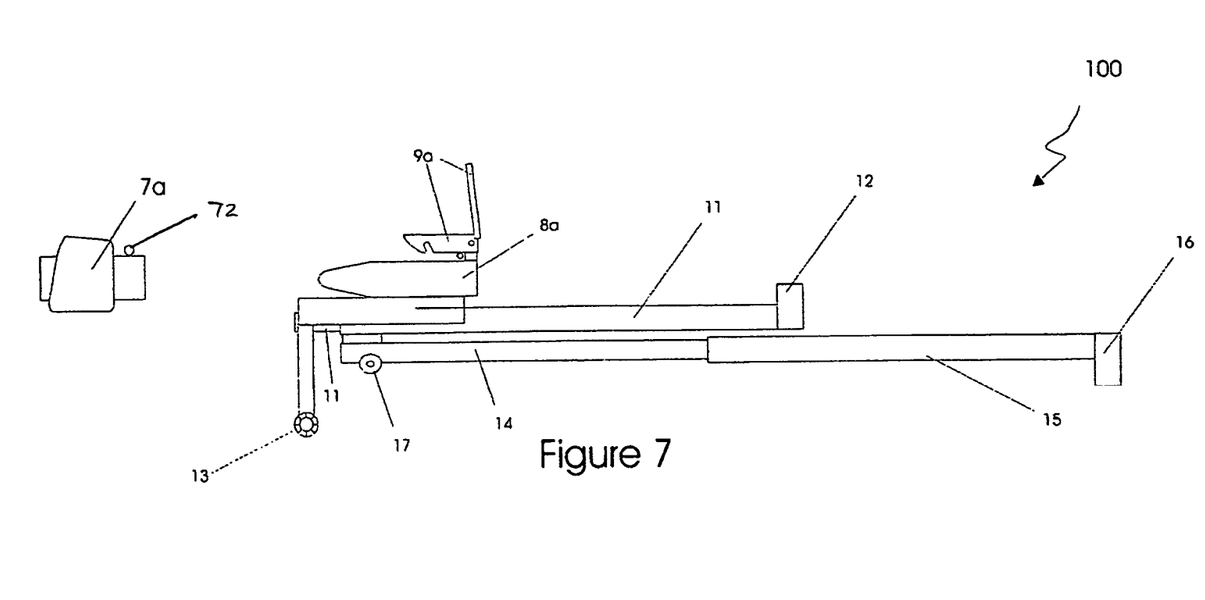
FIG. 7 is a detail view of a blade style docking device in accordance with an embodiment of the present disclosure.

Referring to FIG. 7, the blade style docking device is shown in which the wheelchair 2 is fitted with a receiver plate 7a which has a slot into which a blade 8a fits as a receiver plate 7a moves rearward to induce a latching action. The receiver plate 7a incorporates a protrusion 72 which when receiver plate 7a moves rearward induces a pivoting motion of a latch 9a and a positive latching connection between a slot in the latch 9a and the protrusion 72. A "v" leading edge of the blade 8a facilitates the user making a connection between the blade 8a and the receiver plate 7a. In an alternative embodiment, the wheelchair could be fitted with the blade 8a and the receiver plate 7a could be mounted to the vehicle.

Figure 9:
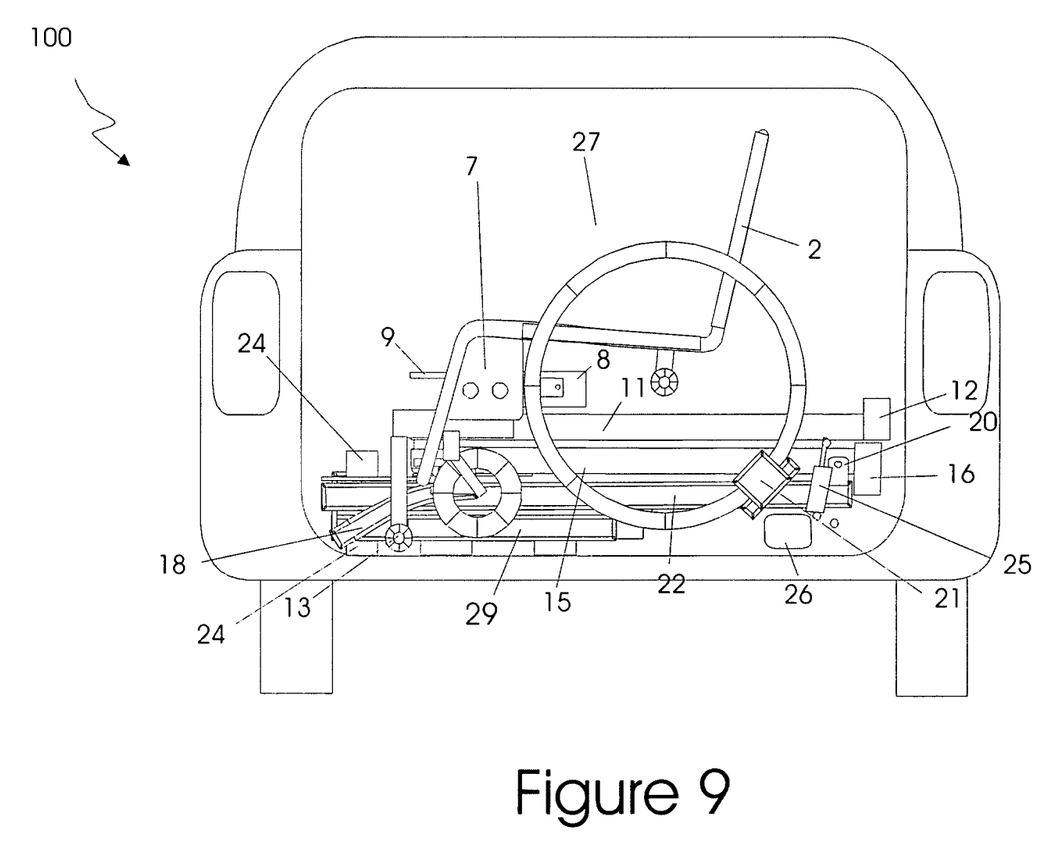
FIG. 9 is a rear view of a power lift and transfer system in accordance with an embodiment of the present disclosure in a hatch/trunk storage version with a wheelchair in a fully stowed position.
Figure 10:
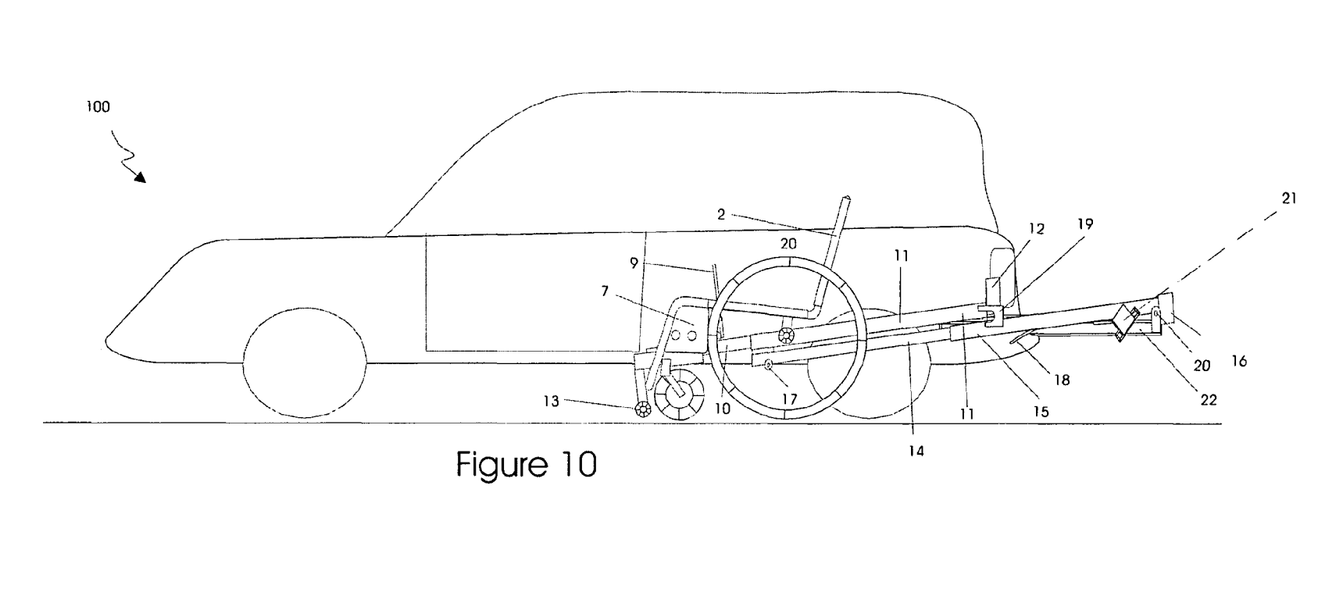
FIG. 10 is a side view of a power lift and transfer system in accordance with an embodiment of the present disclosure in a hatch/trunk storage version with a wheelchair on the ground, fully deployed and adjacent to a door of a vehicle using a latch and bolt style docking device as detailed in FIG. 5.

Referring to FIGS. 10 and 9, the system 100 is represented in an interior-mounted configuration which is similar to the hitch-mounted versions reflected in FIGS. 1-4, with the exception that a mounting support 29 is located inside a cargo area or trunk 27 of the vehicle. In this version of the system 100, when a horizontal support bar 18 reaches a fully stowed position, which may be substantially perpendicular to the longitudinal axis of the vehicle or, if space in an interior of the vehicle permits, may travel beyond that position to a position more parallel to a longitudinal axis of the vehicle. In this configuration, the wheelchair and system are fully inside the vehicle when in a fully stowed position.

Figure 11:
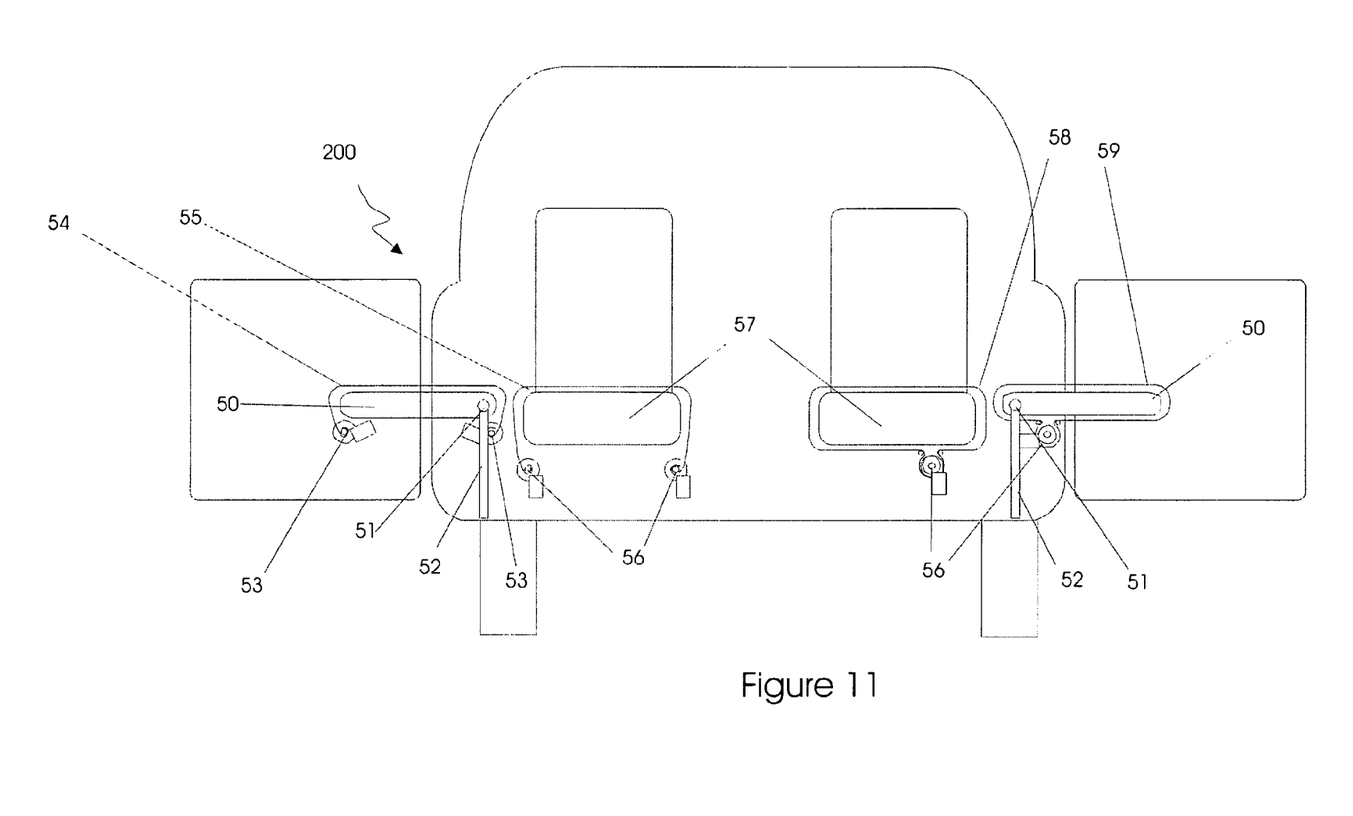
FIG. 11 is a rear view of a power lift and transfer system in accordance with an embodiment of the present disclosure depicting a conveyor and support system to facilitate transfers of a user into a vehicle.

Referring to FIG. 11, there is shown a conveyor and support system 200 in accordance with an embodiment of the present disclosure. Beginning on a left side and in accordance with a typical transfer sequence for a disabled user, the user may first deploy a transfer support 50 from a substantially vertical axis by pivoting the transfer support 50 about an axis of an axle 51 to a substantially horizontal position suitable for a level transfer from a wheelchair. The user may activate motor pairs 53 and 56 which in turn may cause a top surface of conveyor belts 54 and 55 to create an inward motion. The user may then transfer to a top of a conveyor belt 54 and be transported over the transfer support 50 and a seat of the vehicle 57 toward an interior of the vehicle. The user may stop the motors when in an appropriate position.

In an alternate configuration to system 200, represented on the right side of FIG. 11, the system 200 may operate in a similar manner to that described above for the system 200 on the left side of FIG. 11 with the exception that conveyor belts 58 and 59 may be constructed in a continuous loop fashion and surround the seat 57 and the transfer support 50 in order to reduce a number of motors 56 as well as a complexity and cost of production of the system 200.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A docking assembly to secure a mobility device comprising:
    a receiving element comprising a receiving slot with a shaped opening and a protrusion formed on an outside surface of the receiving element;
    a blade element configured to engage the shaped opening of the receiving slot of the receiving element such that when the blade element is engaged with the shaped opening of the receiving slot the blade element is prevented from rotating within the receiving slot; wherein the blade element comprises converging gradients on opposing edges thereof to facilitate engagement with the shaped opening of the receiving slot of the receiving element when the blade element and the shaped opening of the receiving slot of the receiving element are not aligned along either of two axes; and
    a latching mechanism coupled to the blade element and configured to perform a latching action and a unlatching action, wherein the latching action is performed when the blade element engages with the shaped opening of the receiving slot and the protrusion engages with the latching mechanism, thereby inducing a pivoting motion of the latching mechanism, such that when the blade element engages with the shaped opening of the receiving slot and the protrusion engages with the latching mechanism the blade element is prevented from disengaging from the receiving slot until the unlatching action is performed.

2. The docking assembly of claim 1, wherein the blade element is coupled to a vehicle to secure the mobility device to the vehicle.

3. The docking assembly of claim 2, wherein the blade element is coupled to an inside portion of the vehicle to secure the mobility device inside of the vehicle.

4. The docking assembly of claim 2, wherein the blade element is coupled to an outside portion of the vehicle to secure the mobility device outside of the vehicle.

5. The docking assembly of claim 1, wherein the receiving element is mounted on the mobility device.

6. A docking assembly to secure a mobility device comprising:
    a blade element wherein the blade element comprises converging gradients on opposing edges thereof;
    a receiving element comprising a receiving slot having a shaped opening and a protrusion formed on an outside surface of the receiving element, the receiving element configured to engage the blade element such that when the blade element is engaged with the shaped opening of the receiving slot the blade element is prevented from rotating within the receiving slot; wherein the converging gradients on opposing edges of the blade element facilitate engagement of the blade element with the shaped opening of the receiving slot of the receiving element when the blade element and the shaped opening of the receiving slot of the receiving element are not aligned along either of two axes; and
    a latching mechanism coupled to the blade element and configured to perform a latching action and a unlatching action, wherein the latching action is performed when the blade element engages with the shaped opening of the receiving slot and the protrusion engages with the latching mechanism, thereby inducing a pivoting motion of the latching mechanism, such that when the blade element engages with the shaped opening of the receiving slot and the protrusion engages with the latching mechanism the blade element is prevented from disengaging from the receiving slot until the unlatching action is performed.

7. The docking assembly of claim 6, wherein the blade element is coupled to a vehicle to secure the mobility device to the vehicle.

8. The docking assembly of claim 7, wherein the blade element is coupled to an inside portion of the vehicle to secure the mobility device inside of the vehicle.

9. The docking assembly of claim 7, wherein the blade element is coupled to an outside portion of the vehicle to secure the mobility device outside of the vehicle.

10. The docking assembly of claim 6, wherein the receiving element is mounted on the mobility device.

11. A docking assembly to secure a mobility device comprising:
    a bolt plate comprising at least two bolts disposed along different axes;
    a receiving element comprising a shaped opening, the receiving element configured to engage the at least two bolts of the bolt plate such that when the at least two bolts of the bolt plate are engaged with the shaped opening of the receiving element the bolt plate is prevented from rotating within the shaped opening; and
    a latching mechanism coupled to an external surface of the receiving element and configured to perform a latching action and a unlatching action, wherein the latching action is performed when the at least one bolt of the bolt plate engages with the shaped opening of the receiving element, thereby inducing a pivoting motion of the latching mechanism, such that when the at least one bolt of the bolt plate engages with the shaped opening of the receiving element the bolt plate is prevented from disengaging from the shaped opening until the unlatching action is performed.

12. The docking assembly of claim 11, wherein the receiving element is coupled to a vehicle to secure the mobility device to the vehicle.

13. The docking assembly of claim 12, wherein the receiving element is coupled to an inside portion of the vehicle to secure the mobility device inside of the vehicle.

14. The docking assembly of claim 12, wherein the receiving element is coupled to an outside portion of the vehicle to secure the mobility device outside of the vehicle.

15. The docking assembly of claim 11, wherein the bolt plate is mounted on the mobility device.

16. A docking assembly to secure a mobility device comprising:
   a receiving element comprising a shaped opening;
   a bolt plate comprising at least two bolts disposed along different axes, the at least two bolts of the bolt plate configured to engage the shaped opening of the receiving element such that when the at least two bolts of the bolt plate are engaged with the shaped opening of the receiving element the bolt plate is prevented from rotating within the shaped opening; and
   a latching mechanism coupled to an external surface of the receiving element and configured to perform a latching action and a unlatching action, wherein the latching action is performed when the at least one bolt of the bolt plate engages with the shaped opening of the receiving element, thereby inducing a pivoting motion of the latching mechanism, such that when the at least one bolt of the bolt plate engages with the shaped opening of the receiving element the bolt plate is prevented from disengaging from the shaped opening until the unlatching action is performed.

17. The docking assembly of claim 16, wherein the receiving element is coupled to a vehicle to secure the mobility device to the vehicle.

18. The docking assembly of claim 17, wherein the receiving element is coupled to an inside portion of the vehicle to secure the mobility device inside of the vehicle.

19. The docking assembly of claim 17, wherein the receiving element is coupled to an outside portion of the vehicle to secure the mobility device outside of the vehicle.

20. The docking assembly of claim 16, wherein the bolt plate is mounted on the mobility device.

* * * * *